United States Patent [19]

Pitroda

[11] 3,999,050

[45] Dec. 21, 1976

[54] ELECTRONIC DIARY

[76] Inventor: Satyan G. Pitroda, 1 S. 310 Danby, Villa Park, Ill. 60181

[22] Filed: Oct. 10, 1975

[21] Appl. No.: 621,636

[52] U.S. Cl. .............................. 235/152; 58/152 R; 340/172.5

[51] Int. Cl.[2] .................. G04C 23/12; G06F 15/20; G07C 1/10

[58] Field of Search ......... 235/152, 156; 58/152 R; 340/172.5

[56] References Cited

UNITED STATES PATENTS

| | | | |
|---|---|---|---|
| 3,803,834 | 4/1974 | Reese | 58/152 R |
| 3,816,730 | 6/1974 | Yamamoto et al. | 235/156 |
| 3,920,979 | 11/1975 | Kilby et al. | 340/172.5 |
| 3,937,004 | 2/1976 | Natori et al. | 58/152 B |
| 3,940,746 | 2/1976 | Vittorelli | 340/172.5 |

OTHER PUBLICATIONS

"'Compact', 'diary', checkbook all count" *Electronics* Apr. 3, 1975, pp. 40–41.

*Primary Examiner*—David H. Malzahn
*Attorney, Agent, or Firm*—Lester N. Arnold

[57] ABSTRACT

An electronic diary having combined clock-calendar means and diary storage means is provided wherein a random access memory is employed in a diary mode of operation for the storage and readout of preselected daily schedule and message events keyed for visual display in response to equal time comparisons with real time of day TOD as generated by the clock-calendar means. The electronic diary is capable of being added to present state-of-the-art electronic calculators for facilitating economy of parts through commonality of keyboard, power supply and visual display features. The electronic diary is comprised of a keyboard selector panel, power supply means, a message storage and control unit, a clock and calendar unit, display control logic, time comparison logic, audible alarm, and visual display means. Optionally, the electronic diary is comprised of a keyboard selector panel, power supply means, memory, micro-processor circuit, and visual display means. The electronic diary can serve to remind the user of an important message event through application of an audible alarm while visually displaying the associated message data.

21 Claims, 18 Drawing Figures

DISPLAY CONTROL LOGIC 29

CLOCK & CALENDAR UNIT 27

CALENDAR COUNTERS

TIMING DIAGRAM

MESSAGE STORAGE & CONTROL UNIT 25

CONTROL LOGIC 151 AND OUTPUT LOGIC 157 FOR THE
MESSAGE STORAGE AND CONTROL UNIT 25

MESSAGE ENTRY TIME MEMORY 155

MESSAGE MEMORY RAM 153

TIME COMPARE UNIT

ELECTRONICS DIARY USING MICRO-PROCESSOR ARRANGEMENT

ELECTRONIC DIARY

BACKGROUND OF THE INVENTION

This invention relates in general to an electronic display apparatus, and in particular to an electronic diary having combined time of day TOD clock means and diary storage means for storage and readout of preselected daily schedule and message events in coordination with preselected TOD comparisons.

The recent advances in the field of electronic manufacturing and packaging have brought to the consumer market a variety of electronic apparatus not heretofore economically or technically feasible for use by the average consumer. Most of these products are electronic solid state counterparts to well known electro-mechanical devices, and examples of such widely marketed products include consumer adapted electronic calculators, solid state watches, electronic calendars, clock radios, and so on. The application of solid state circuitry provides a device of smaller compact size, increased reliability, reduced overall weight and may provide cost advantages in some instances. Further, these various devices have been combined for market attractiveness into such combinations as clock and calculator, radio and clock, and clock and calendar units.

It is thought that the calculator industry has largely taken one direction in these improvement features being offered, that is, to provide more and more variations in calculation methods such as now offered on multifunction calculators. The extension of calculators with their readily accessible keyboards and digital displays, into non-calculating functions particularly applicable to consumer uses has not been as well explored. In the present invention, it is shown to be highly desirable to convert for electronic application the largely manual techniques of formulating and maintaining daily schedules of appointments and other important event occurrences that comprise the average work day of a consumer. At the same time, it is felt that the keyboard and display apparatus of most electronic calculators could be judiciously employed to provide storage and visual readout of selected messages from a programmed daily event memory schedule.

Accordingly, the disclosed electronic diary is comprised of message storage and control means and a clock and calendar unit incorporated as ancillary features into an electronic calculator. The electronic diary stores preselected message samples through the use of the keyboard input and coordinates the readout of such message samples with the clock and calendar unit. Additionally, there can be provided an audible alarm at an appropriate message time as through a buzzer or other suitable sounding device while simultaneously displaying the associated message sample. It is to be appreciated that such an electronic diary does not require combined use with an electronic calculator but such a product combination is thought to be exceedingly appealing to the consumer.

SUMMARY OF THE INVENTION

It is therefore an object of the present invention to provide an electronic diary in the form of an electronic display apparatus having combined clock and calendar means and diary storage means.

It is another object of the invention to provide a convenience of hardward implementation wherein the clock and calendar means and the diary storage means are incorporated as ancillary features into an electronic calculator.

It is still another object to provide input registration of selected message data events into the diary storage means through the use of the existing calculator type keyboard and to coordinate the visual readout of the same with the clock and calendar means.

It is yet another object to provide comparison means for comparing the real time TOD of the clock and calendar means with the preselected occurrence time for an associated message data event and for inhibiting clock and calendar displays for visual display of the associated message data sample.

It is a further object of the invention to provide a suitable audible alarm at appropriate message times while simultaneously displaying the associated message sample.

The present invention provides an electronic display apparatus for storing and displaying predetermined daily schedule and message events or samples and is hereinafter conveniently referred to as an electronic diary even though it is also disclosed in an exemplary combination with an electronic calculator. The electronic diary can serve to remind the user of an important message event through application of an audible alarm while visually displaying the associated message data. The electronic diary is fundamentally comprised of a standard push-style or touch button selector keyboard, message storage and control means, clock and calendar means, time comparison logic, power supply means, display control logic with associated display circuitry, visual display means and audible alarm means.

In a typical non-diary mode, the electronic diary is designed to operate as a digital clock-calendar. The clock-calendar operation typically utilizes an oscillator circuit to provide the pulses inputted to counter circuits for generation of the time units of seconds, minutes, hours, days, month and year displayed as real time of day TOD. The counter circuits are resettable by reset keys on the selector keyboard. In the diary mode, the keyboard is utilized to provide registration of message data, either coded or non-coded, inputted to a message storage and control unit which stores the selected message data in association with a keyboard selected message time of day TOD used for the occurrence of the message time. During the process of message registration, it is both convenient and desirable to display the message data for visual verification. Several messages are caused to relate to various message times that are to occur during a work period and such messages and message times are stored for comprising an events calendar or diary.

Upon completion of message data input registration, the electronic diary is returned to the clock-calendar mode, and suitable logic comparison circuit means begins to compare stored message times TOD with real time TOD from the clock and calendar unit. When such time comparisons find a time match, the normal clock calendar information is inhibited to allow the stored message data to be visually displayed. Optionally, the message data display could be flashed on and off and/or an audible alarm could be sounded to draw special attention to the visual message display. Following either manual reset of the inhibiting circuitry or automatic reset after an elapsed display interval, the normal clock calendar data is again displayed. Desirably, the electronic diary can be combined with a hand-held or desk-top calculator to enhance the non-calculating versatility thereof without significant hardware addition. Further, the events calendar or schedule primarily discussed herein provides a typical daily page, but it is to be understood that schedules of other time bases could be programmed for display.

It is believed that the electronic diary will prove to be of considerable aid within government, industry and private sectors in providing a convenient means for the management, programming and monitoring of various day-to-day activities and performances. These and other objects of the invention will become apparent and obvious to those skilled in the pertinent art upon referring to the following description provided in connection with the accompanying drawings, of which:

DETAILED DESCRIPTION

Figure 1:
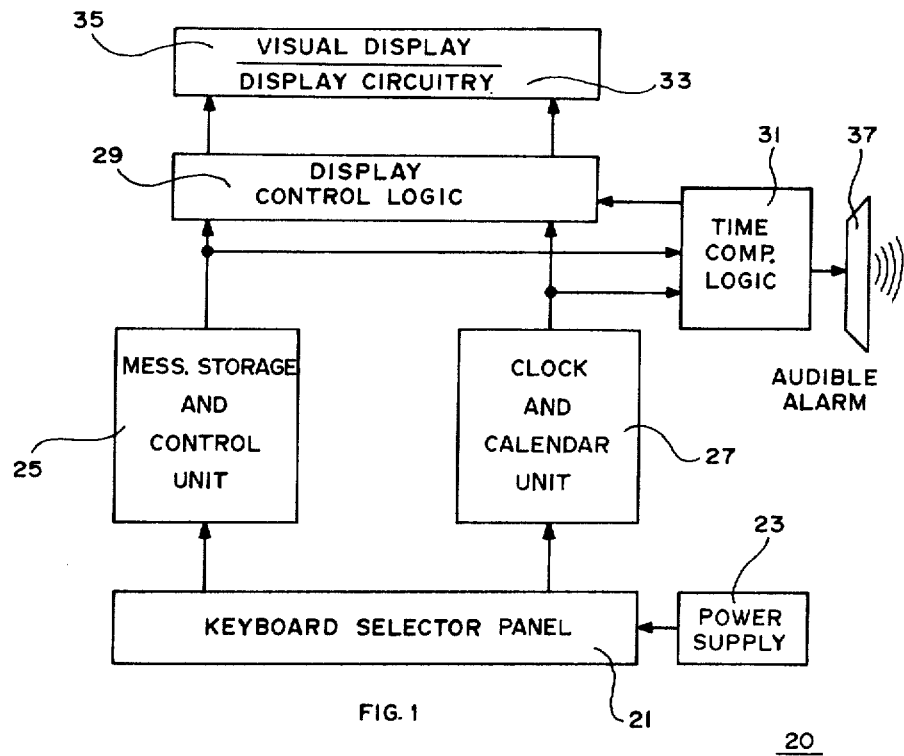
FIG. 1 is a representative functional block diagram of an electronic diary showing a message storage and control unit and a clock and calendar unit having the respective outputs thereof compared by time comparison logic for alternate selection thereof in accordance with the present inventions.

There is shown in FIG. 1 an electronic diary circuit 20 having a keyboard selector panel 21 typically comprised of a standard arrangement of push-style or touch-button keys, a suitable source of electric power such as power supply 23 feeding the keyboard selector panel 21 in addition to the power requirements of the entire circuitry of the electronic diary 20, a message storage and control unit 25, a clock and calendar unit 27, display control logic 29, time comparison logic 31, display circuitry 33 interfacing the display control logic 29 with visual display means 35, and an optional audible alarm means 37.

In a normal mode of operation, the electronic diary 20 functions as a digital or solid state clock and calendar, that is, the clock and calendar unit 27 provides readings of real time of day TOD in units of seconds, minutes and hours and calendar events of days, months and years. These real time TOD readings are connected to the display control logic 29 and the time comparison logic 31. The time comparison logic 31 further receives, during initial registration thereof, preselected message data and preselected assigned display times known as message times TOD. The real time TOD readings are continuously compared to the message times TOD and when an equal comparison is detected by the time comparison logic 31, the display control logic 29 is inhibited from displaying the clock-calendar readings and instead, message storage and control unit 25 readings are visually displayed. An audible alarm may occur from activation of the audible alarm means 37. Unless an inhibit is imposed by the time comparison logic onto the display control logic 29, the real time TOD readings are visually displayed on the visual display apparatus 35.

Figure 2:
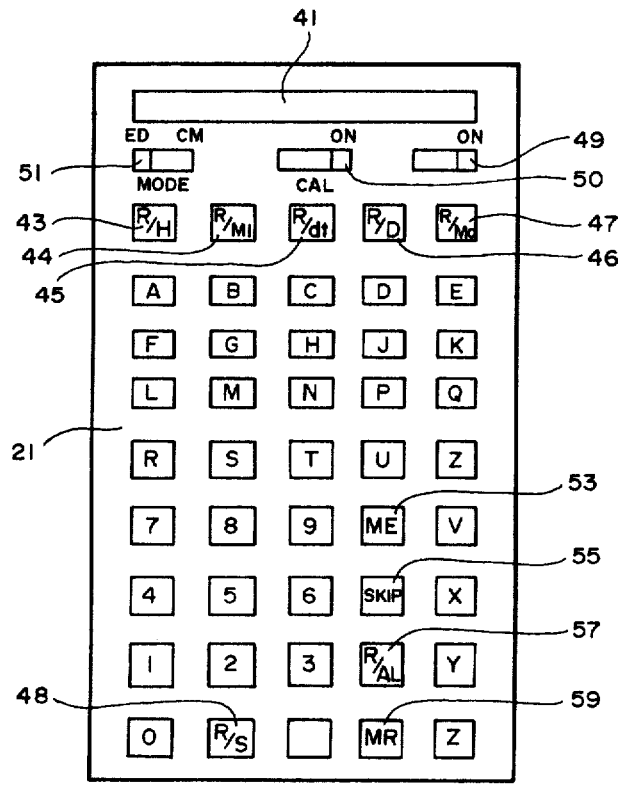
FIG. 2 is a pictorial representation of a typical keyboard selector panel.

FIG. 2 shows a suggested key arrangement for the keyboard selector panel 21 wherein a digit display window 41 is shown in the upper portion thereof. Reset keys 43-48 designate the functions of reset hours R/H, reset minutes R/Mi, reset date R/dt, reset day R/D, reset month R/Mo, and reset seconds R/s, respectively. There is a master ON power switch 49, a separate ON power switch 50 for an electronic calculator mode and an ED/CM mode switch 51 which provides alternate selection of electronic diary ED mode or clock-calendar mode CM. Alphabetical Keys A-Z and numerical Keys 0-9 are provided as well as a message enter ME Key 53, a message skip (Skip) Key 55, a reset alarm R/AL Key 57, and a message erase MR Key 59.

Figure 3:
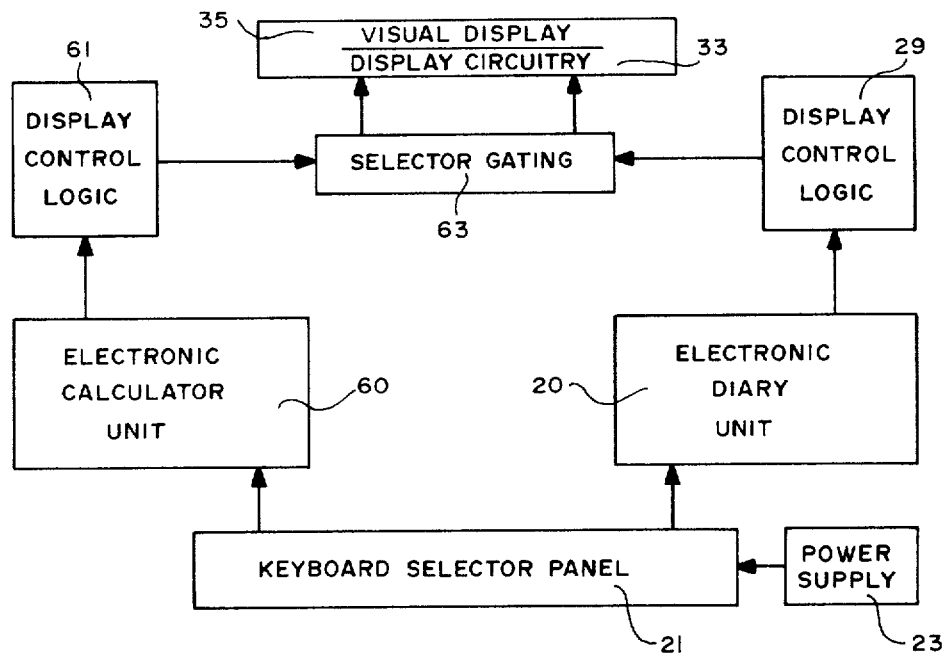
FIG. 3 is a block diagram of the electronic diary of FIG. 1 as shown in combination with an electronic calculator unit.

FIG. 3 shows an exemplary arrangement wherein the electronic diary 20 of FIG. 1 has been judiciously combined with an electronic calculator unit 60. The electronic calcutor unit 60 is of a standard solid state configuration such as most commercially available calculators and can be a hand-held unit or a desk-top unit, the detailed disclosure of the electronic calculator 60 being outside the scope of this invention. It is sufficient for an enabling disclosure of the present invention to fully disclose the electronic diary 20 which may be employed alone or may instead be combined with an electronic calculator 60. For this reason, the keyboard selector panel 21 of the electronic diary 20, as well as the power supply 23 and the visual display 35, are shown as common elements connected to both the electronic diary 20 and the electronic calculator 60. There is shown a display control logic 61 receiving outputs of the electronic calculator 60 and thereafter connecting the same to selector gating 63 which selects outputs for visual display from either the display control logic 61 connected to the electronic calculator 60 or the display control logic 29 connected to the electronic diary 20. The interface display circuitry 33 and the visual display 35 of FIG. 1 are connected to receive inputs from the selector gating 63.

Figure 4:
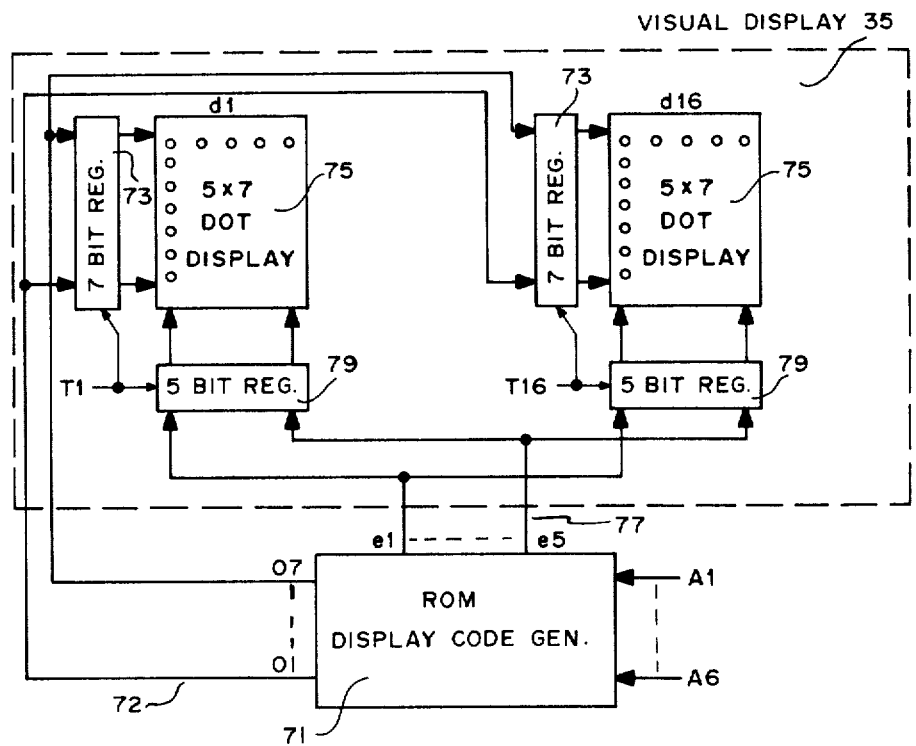
FIG. 4 is a representation of a visual display and a display code generator which is part of the display circuitry of FIG. 1.
Figure 5:
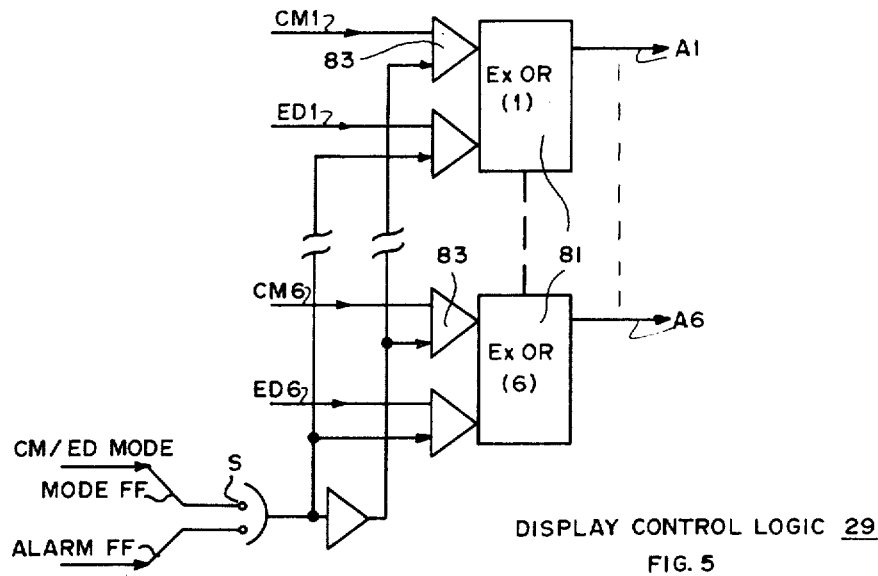
FIG. 5 is a block diagram of a display control logic which also is part of the display circuitry of FIG. 1.

The visual display 35 and a portion of the display circuitry 33 is shown in FIG. 4 wherein a display code generator 71 of the ROM-type, similar to a MOSTEK MK 2000P, receives six separate logic signals A1–A6 that are shown developed by the logic circuitry of FIG. 5. The display code generator 71 develops an output (shown at 72) of seven bits 01–07 which are mutually connected to 16 7-bit registers 73. The visual display 35 includes 16 5×7 dot display matrices 75 assigned reference identifiers of $d1$–$d16$. Further, the display code generator 71 develops another output (shown at 77) of five bits $e1$–$e5$ which are mutually connected to 16 5-bit registers 79. The associated 7-bit register address of each dot display matrix 75 is effective to light a vertical column thereof (as viewed in FIG. 4) in accordance with the coding of the 7-bit address. Similarly, the associated 5-bit register address of each dot display matrix 75 is effective to light a horizontal row thereof (as viewed in FIG. 4) in accordance with the coding of the 5-bit address. Sixteen timing signals indicated as $t1$–$t16$ are developed from a 4 to 16 decoder circuit of the calendar operation circuitry to be disclosed hereinafter and are connected to the 16 sets of 7-bit and 5-bit registers 73 and 79, respectively. FIG. 4 merely illustrates the first and the 16th of the dot display matrices which omitting the obvious inclusion of the second through the fifteenth dot display matrices for the purpose of avoiding undue complexity of the drawing. Further, it has been convenient to utilize a 16 segment display, but it is understood that other type displays such as a 10 or 12 segment display could as well be used.

FIG. 5 shows another portion of the display circuitry 33 used to develop the aforementioned logic signals A1–A6 connected to the display code generator 71. The output signals A1–A6 of FIG. 5 are representative of either a coded address of the clock-calendar mode CM operation of the electronic diary 20 or a coded address of the electronic diary ED mode. There are depicted in FIG. 5, six 6-bit exclusive gates 81 which provide the coded outputs A1–A6, respectively. Two input gates 83 are shown in use with each exclusive OR gate 81, and are selectively activated through switch S by either an alarm flip-flop circuit (FF) or a mode (either clock-calendar mode CM or electronic diary ED mode) flip-flop circuit (FF). The input signals CM1–CM6 of FIG. 5 comprise a 6-bit address from the clock and calendar unit 27; the input signals ED1–ED6 of FIG. 5 comprise a 6-bit address from the message storage and control unit 25.

Figure 6:
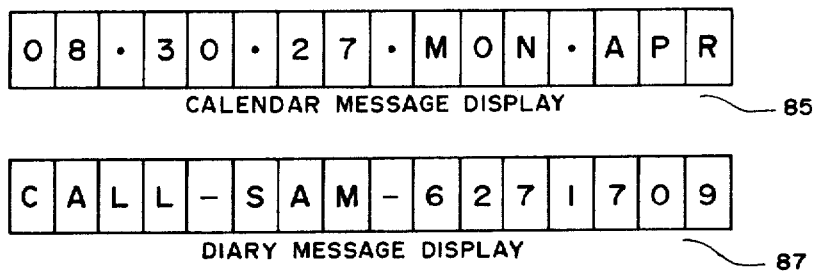
FIG. 6 is a pictorial representation of a typical calendar message display and a typical diary message display as would comprise the visual display of FIG. 1.
Figure 7:
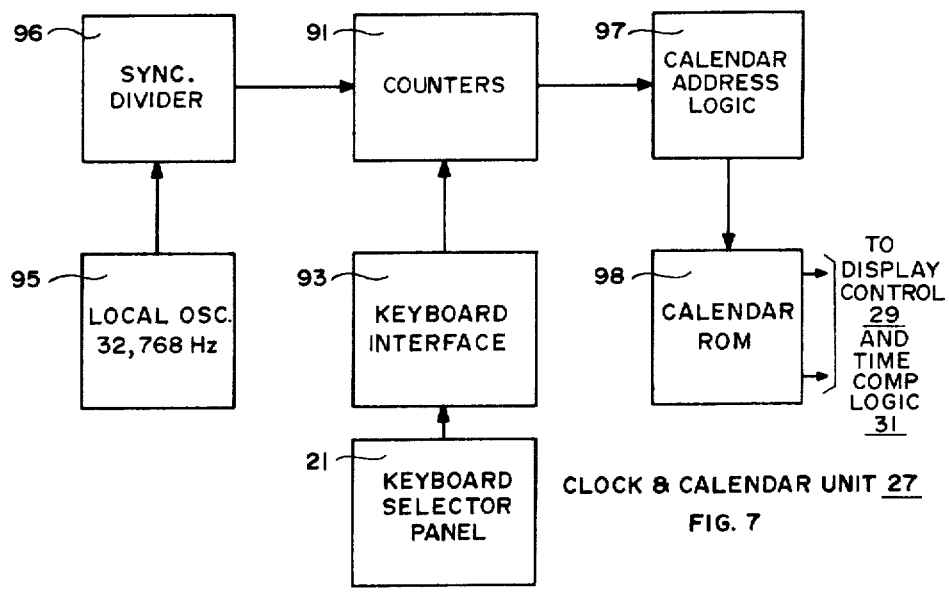
FIG. 7 is a block diagram of the clock and calendar unit of FIG. 1.

There is shown in FIG. 6 a sample calendar message display 85 such as would appear on the visual display 35 during the normal calendar mode CM for the electronic diary 20. A sample diary message display is shown at 87 such as would appear during the electronic diary ED mode of operation. The overall block diagram of the clock and calendar unit 27 is shown in FIG. 7 wherein multiple counters, indicated at 91, are connected for registration inputs through the keyboard selector panel 21 and an associated keyboard interface 93. A local oscillator circuit 95 having a selected oscillator frequency of approximately 32,768 Hz drives a synchronizer divider circuit 96 for development of synchronizer signals which selectively input the seconds counter, the minute counter the hour counter, the day counter and the month counter. The counters 91 provide the appropriate calendar address logic, at 97, which is presented by a calendar ROM circuit 98 to the display control logic 29 and time comparison logic 31.

Figure 8:
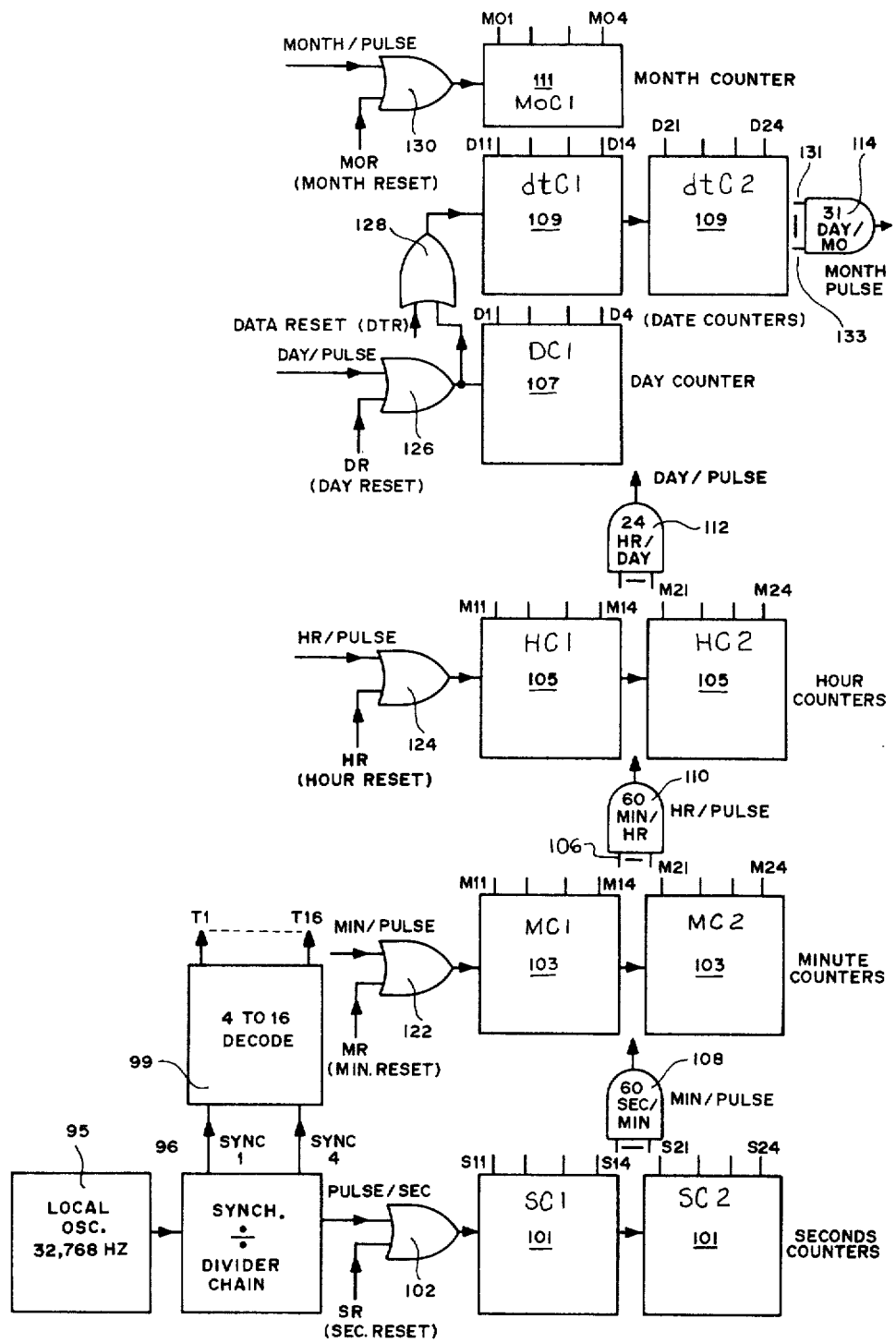
FIG. 8 is a logic schematic diagram of the counters for the clock and calendar unit showing the calendar operation and associated counter arrangements.
Figure 10:
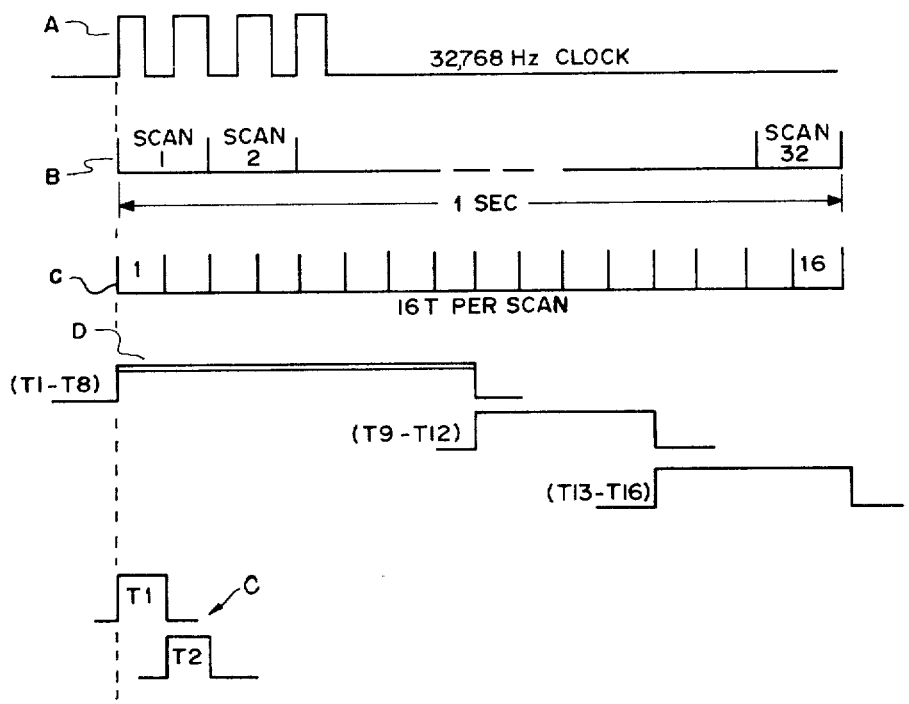
FIG. 10 is a graphical timing diagram useful in connection with disclosure of the present invention.

FIG. 8 shows the normal calendar operation and associated counter arrangements of the clock and calendar unit 27. The local oscillator circuit 95 drives the synchronizer divider chain 96 which provides synchronizer signals SYN 1 – SYN 4. A 4 to 16 (4/16) decoder circuit 99 develops the 16 timing signals $t1$ – $t16$ which have been discussed above in connection with the visual display 35. FIG. 10 shows a timing diagram wherein a repetitive pulse rate, at A, is representative of a 32,768 basic local clock frequency having a pulse period of 0.030 milliseconds (msec). It is known that a 15 stage divide-by-two chain provides a 1 HZ pulse frequency. The pictorial representation at B indicates utilization of 32 scan periods per second with each scan period thereof time divided into 16 sub-periods of approximately 1.95 msec/period (31.25 msec per scan period). Graph C shows individual timing pulses such as $t1$ and $t2$ which occur during times $t1$ and $t2$, respectively, of the 16 scan sub-periods, and graph D shows the resultant continuation timing pulse of T1 – T8, timing pulse T9 – T12 and timing pulse T13 – T16 which combine for the duration of one scan period of the 32 scan periods. The timing signals $t1$ – $t16$ of the decoder circuit 99 mark the occurrence of the 16 scan sub-periods of a selected one of the 32 scan periods show by Graph B of FIG. 10.

There is shown at 101 in FIG. 8 a seconds unit counter comprised of a pair of counters SC 1 and SC 2 which have their count state incremented in response to pulse per second inputs received from the synchronizer circuit 96 through an OR gate 102. The address outputs of the counters 101 are shown as S11–S14 and S21–S24. A reset second SR input is gated to the seconds counter 101 through the OR gate 102. The binary address outputs of the counters 101 are monitored until the binary representation thereof equals the count of 60, representative of 60 second increments for comprising the binary input 104 which triggers NAND logic gate 108 in the development of a minute pulse. Likewise, a 60 count binary representation from minute counters 103 comprise the binary input 106 which triggers NAND gate 110 in the development of an hour pulse. A 24 binary count from hour counters 105 trigger NAND gate 112 to comprise a day pulse. A 31 binary count from the date counts 109 triggers NAND gate 114 to comprise a month pulse. The minute pulse is used to increment the minute counters 103 comprised of a pair of counters MC1 and MC2 having address outputs of M11 – M14 and M21 – M24. A reset minute MR input is gated for reset to the minute counter 103 through an OR gate 122. The hour pulse increments the hour counter 105 comprised of a pair of counters HC1 and HC2 having address outputs coded as H11 – H14 and H21 – H24. A reset hour HR input is gated to the hour counter 105 through an OR gate 124.

The day pulse from gate 112 is applied to increment a day counter 107 comprised of a single counter stage DC1 having address outputs of D1–D4. Only a single stage counter need be used for the day count as conrasted to the two-stage configuration of counters 101, 103 and 105 in order to count seven days per week. A reset day DR input is gated to the day counter 107 through an OR gate 126. A two-stage day counter dtc 1 and dtc 2 109 is incremented by the output of the gate 126 and has address outputs designated as $d11 - d14$ and $d21 - d24$. A reset date dtR pulse is gated to the date counter 109 through an OR gate 128. The month pulse is applied to increment a month counter 111 comprise of a single counter stage MoC 1 having address output designations Mo1 - Mo4. A reset month MoR input is gated to the month counter 111 through an OR gate 130.

The input keyboard panel 21 is utilized to direct messages into the message storage and control unit 25 and to reset the various counters such as discussed above that are used in the clock and calendar unit 27. The clock and calendar unit 27 counts, through its internal local oscillator 95 the seconds, minutes, hours, days and months in real time TOD. During normal calendar mode operation this TOD information is displayed through the display circuitry 33 and visual display 35. The message storage and control until 25 stores preselected messages associated with predetermined message times. For example, a message could be to call SAM on 627-1709 at 8:30. In this case a message time 8:30, the corresponding message is entered through the keyboard 21 and stored in semiconductor memory circuits to be discussed in connection with the message storage and control unit 25. During the process of entering the selected message is also displayed for the visual verification purposes.

Once the selected message is stored, the time comparison logic 31 compares message time TOD and the real time TOD from the clock and calendar unit 27. When these two times coincide, the alarm 37 is activated and the normal calendar information on the display 35 is inhibited through the display control logic 29 and the corresponding message information is instead displayed. Once the message information is utilized, or released, the buzzer alarm 37 is reset and the normal calendar information is again displayed. The display control logic 29 controls the information to be displayed—either from the message storage and control unit 25 (message information) or from the clock and calendar unit 27 (calendar information). The display circuitry 33 consists of alphanumeric displays to allow the messages to be read in English alphabet.

The keyboard 21 can be powered by the ON switch and through the mode switch, either the "diary" mode (ED) or the calendar mode (CM) can be selected. If calculator functions are incorporated together with the diary functions, a separate CAL switch can also be provided. The typical keyboard 21 includes various reset buttons and keys for message input. The keyboard 21 has associated circuitry to provide various pulses from the key action. These pulses are either single short duration pules, such as from the reset keys and the keys associated with message manipulations, or a 6-bit binary code such as from the alphanumeric keys. The selected input in the form of pulses and binary code levels from the keyboard 21 is provided to the message and storage unit 25 and the clock and calendar unit 27. In brief, the keyboard 21 is similar to those utilized in present hand-held or desk top calculators. However, the details regarding the type of keys and the overall key arrangement can vary depending upon the specific application and design. For example, if instead of an alphanumeric display, a seven segment display is used; the limited display capabilities will allow only a selected number of characters on the keyboard 21. As a result, the number of keys on the keyboard 21 can be minimized. The number of input keys can also be minimized by restricting message inputs and by providing special codes for frequently used messages (such as C=Call, M=Meeting, etc.).

The 5 × 7 dot display of FIG. 4 allows flexibility in displaying alpha and/or numeric messages. As mentioned earlier, this display could also use seven segment devices with limited message displaying capabilities. For example, on a seven segment display it is difficult to display G, M, N, V, X, Y, etc. The 5 × 7 dot display requires 5-bit and 7-bit registers 79 and 73, respectively, at the input to each digit (d1 to d16) for holding the binary input required to strobe the display. The use of such registers enables the application of liquid crystal displays with low energy consumption. The display register requirement may be eliminated by fast scan cycle in the case of usage of light emitting diodes LED.

As shown here, each of the 16 digits $d1-d16$ derives its input from the display code generator ROM 71. Based on the binary code provided by the ROM in the required 5 × 7 format, the dot display lights corresponding light emitting diodes LED to represent the required message. As heretofore mentioned, the ROM 71 provides information for all 16 digits. This information is loaded into the registers 73 and 79 corresponding to each of the digits by a series of timing pulses ($t1$ thru $t16$). In other words, each digit gets its information from the ROM 71 during a dedicated time slot. As a result, in each scan each digit is refreshed once.

The ROM 71 generates the output required for the message display based on the input provided by the display control logic 29. This ROM 71 is a standard commercial device, as stated above, similar to MK200p manufactured by MOSTEK. It accepts 6-bit input to allow 64 different characters to be displayed. The output signals from the ROM 71 consists of two sets of lead; one corresponding to a 7-bit column and another corresponding to a 5-bit row. The display control logic 29 performs the traditional OR function. The inputs to the circuit 29 consists of a 6-bit address from the clock and calendar circuit 27 and a 6-bit address from the message storage and control unit 25. Based on the status of the mode FF or the alarm FF of FIG. 5, the display control logic 29 provides address either from the calendar mode CM or from the diary mode ED. For example, when the alarm FF is active the information from the diary is displayed. It could be either a message being simultaneously entered or a stored message. Hence, the display control logic 29 consists of a plurality of 6-bit OR circuits. Further, the display circuit 33 is under the control of the display control logic 29 which provides an appropriate address based on the status of the mode FF flip-flop. The ROM 71 code generator generates the required code for the 5 × 7 display unit 75. As a result, the visual display 33 provides the required message or the calendar information.

As shown in FIG. 6, during normal calendar operation (EM mode), the displayed information relates to the hour, minutes, day and month. However durng the diary mode ED, the message relates to a preselected schedule event. When desired, the message display can be reset to again resume normal calendar operation. It should be noted that during normal calendar information, a specific message format with fixed location to display hours, etc. is used on a 16 digit display. The message format with fixed location is as shown in Table I below:

TABLE I

| Display digits location | Message |
| --- | --- |
| 1-2 | Hr |
| 3 | . (Period) |
| 4-5 | Minutes |
| 6 | . |
| 7-8 | Date |
| 9 | . |
| 10-11-12 | Day |
| 13 | . |
| 14-15-16 | Month |

It should be evident that due to this fixed location format the message for that location is scanned only during a dedicated time slot. For example, digit one (display No. 1) would always be refreshed in time $t1$ and thus the message associated with digit one would always be sampled during $t1$. The fixed message format is not valid for diary messages.

As shown in FIG. 7, the free running local oscillator 95 provides a basic frequency to derive all system timing activities. The frequency of 32768Hz is such that a divide by 15 in a synchronizer circuitry 96 provides one pulse per second pulse rate. This pulse rate is applied to the counters 91 to count seconds (up to 60) and minutes, etc. The keyboard interface 93 is provided to set and reset various timing clocks shown in FIG. 8. The calendar address logic 97 of FIG. 7 generates appropriate addresses to read information from the calendar ROM 98. The binary output of the calendar ROM 98 is used as the input signal to the display control logic 29 for addressing ROM 71. The calendar address logic 97 is such that based on the status of the counters 91 it addresses corresponding words in the display ROM 71 of FIG. 4. For example, if the counters 91 represent second day of the week, the words corresponding to Tuesday (TUE) are addressed in the display ROM 71 through the calendar ROM 98 and outputted to the visual display unit 35. The output of the calendar ROM 98 is also provided to the time compare logic 31 so as to compare the real time TOD clock with the message time TOD. As discussed above, when real TOD and message TOD match, a message display is presented and optionally an audible may be activated.

With reference to FIG. 8, the basic frequency is divided by 15 segments to obtain one pulse per second in synch chain divider 96. Simultaneously, the 1 Hz pulse is multiplied into 32 scan cycles. These scan cycles are further divided into 16 time periods $t1-t16$ using the 4 to 16 decode circuitry 99. The timing pulses $t1-t16$ are used for scanning and other timing activities. The 1Hz pulse is used to count 60 second per minute thru the second counter 101. The counter 101 also has an input thru the reset key SR. The second counter 101 is reset by the minute pulse generated by the NAND gate 108 every 60 second. Similarly, the minute counter 103 accepts input from the min/pulse and reset key MR through the OR gate 122. The counter 103 counts up to 60 and resets itself by an hour pulse generated by the NAND gate 110. The hour pulse serves as an input to the hour counter 105 with an hour reset pulse thru the OR gate 124. The hour counter 105 counts up to 24 and generates a day pulse by the NAND gate 112. The day pulse resets the hour counter 105 and advances the day counter 107. The day counter 107 counts up to seven days and resets itself. The day pulse is also provided to the date counter 109 along with the date reset. The date counter 109 counts up to 31 and generates a month pulse by the NAND gate 114 to advance a month counter 111. The month counter 111 counts up to 12 and resets itself. The numerous resets to the counters of FIG. 8 are provided as push-type selector keys on the keyboard 21. The clock and calendar unit 27 is designed such that one pulse per second signal is available upon use of the separate calendar reset keys. Similar calendar circuits to that discussed herein are thought to be well known in the pertinent industry and are presently being utilized in some commercially available electronic calendar units. In fact, several semiconductor manufacturers are thought to provide standard calendar circuits on single circuit chips.

Figure 9:
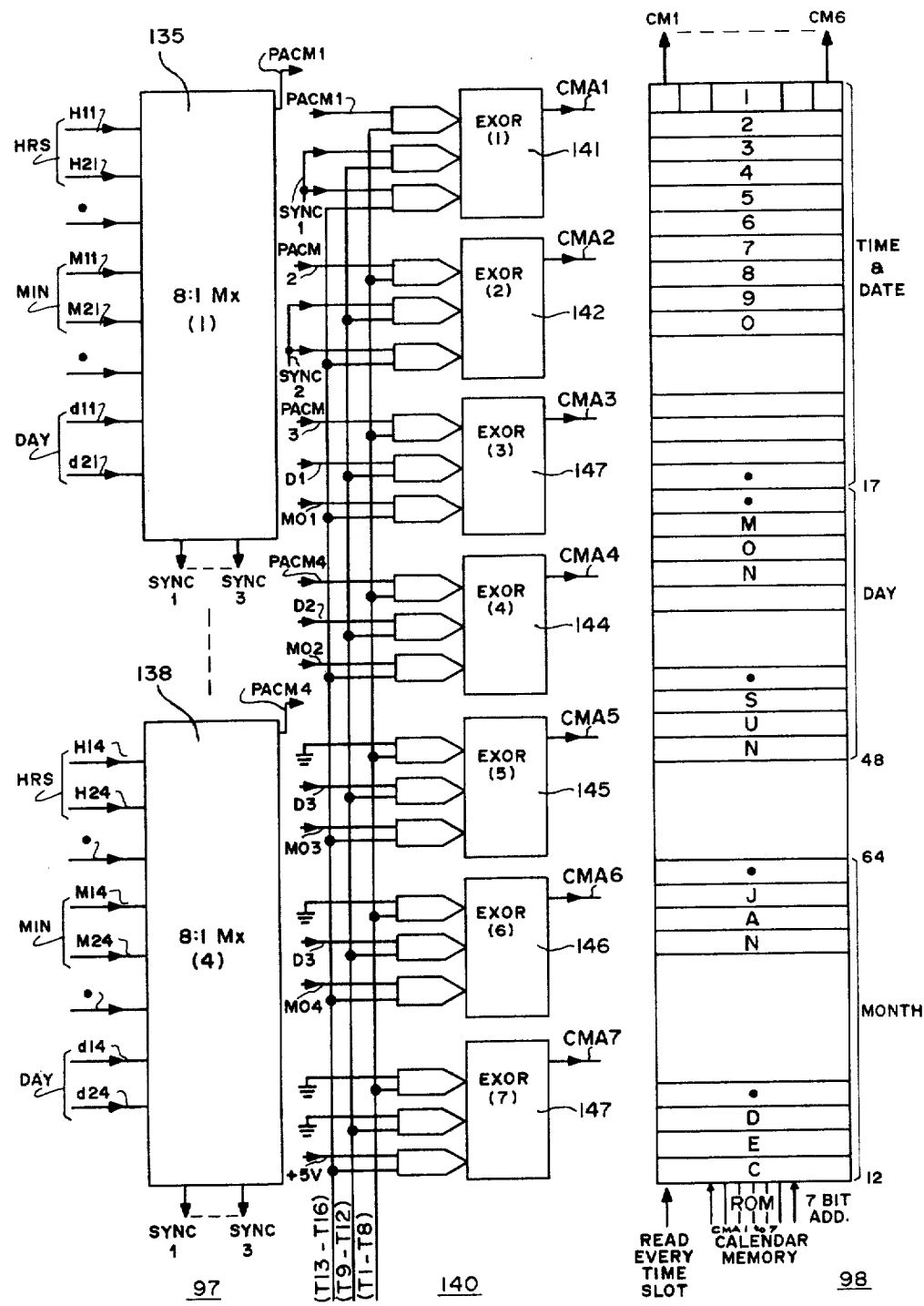
FIG. 9 is a logic schematic diagram of the calendar address logic and the calendar ROM of the clock and calendar unit.

FIG. 9 shows the calendar address logic 97 of FIG. 7 and the calendar ROM 98 of FIG. 7. The outputs of the counters 101, 103, 105, 107, 109 and 111 are provided to a plurality of multiplexer circuits 135-138 having an 8:1 ratio, only the multiplexer 135 and 138 being shown in FIG. 9. The four multiplexers generate first outputs of PACM1 through PACM4, which outputs are connected to pre-memory stage calendar address logic 140. Each of the multiplexers 135-138 provide output lead signals SYN1-SYN3, only of which SYN1 and SYN2 are applied to the calendar address logic 140. The address logic 140 is comprised of seven exclusive OR gates 141-147 and are used to develop a seven bit address to the calendar ROM 98. The seven bit address is known as the calendar memory address CMA and consists of signals CMA1-CMA7.

As disclosed above, a specific message format is used with a fixed location to display time units such as hour, minute, etc.; hence, a specific scan time is automatically allocated to scan each of the counters 91. For example, since the first two digits always represent hours, the hour counter 105 is scanned during time periods $t1$ and $t2$. Hence the output address of the counter 105 at times $t1$ and $t2$ is provided to the ROM 98 which in turn provides the command address to access the display code generator 71. The addressing format is related to the scan timing and multiplex operation. The output of each counter 91 is comprised of a digit representing a four digit binary format. The six counters 101-111 are to be displayed in the first eight digits of the visual display 35 according to the format of TABLE II below:

TABLE II

| | |
| --- | --- |
| Hours | d1 d2 |
| Space (.) | d3 |
| Minutes | d4 d5 |
| Space (.) | d6 |
| Date | d7 d8 |

Accordingly, the binary output of these six counters 101-111 must be time division multiplexed such that during time period $t1$, the address from the first hour counter HC1 appears on the carrier bus and during the time period $t2$, the address from the second hour counter HC2 appears. Similarly, the address corresponding to a dot (.) appears in time period $t3$. The desired multiplexing action is achieved employing the four 8:1 multiplexer circuits 135-138; hence, one muliplexer for each counter output lead. Each input of a given one of the 8:1 multiplexer circuits correspond to a specific digit on the visual display 35, and thus is sampled in an assigned time slot. The multiplexer outputs PACM1-PACM4 (preliminary address for the calendar memory) comprise the time division multiplexed information. The multiplexer information is further multiplexed with the information from the month counter 111 and the day counter 107. Since the day and month counters 107 and 111, respectively, have outputs which correspond to a display of four digits per counter (such as MON. or JAN., etc. as contrasted to one digit display per counter in the case of hour, minute and day counters), the multiplexing function or action is formulated such that the day counter 107 is displayed at $d9$ to $d12$ and the month counter 111 is displayed at $d13$ to $d16$.

The disclosed circuit arrangement of the calendar address logic 140 is such that the binary output from the gates 141-144, herein called the primary multiplexers, appears during the time periods $t1-t8$; the output from the gate 145, called a day multiplexer, appears during the time periods $t9-t12$; and the output from the gate 146, called a month multiplexer, appears during the time periods $t13-t16$. Gate 147 is a power or ground signal. These timing pulses are shown in FIG. 10, Graph D.

The calendar memory 98 is of the read only type ROM in which there are provided a plurality of individual memory slots or word slots having capacity for numerals 0-9, days MON.-SUN. and months JAN.-DEC. from which the time and date, day and month can be formulated. The calendar ROM 98 is divided into three groups of word slots. The first word slot group contains the addresses corresponding to digit 0-9 used for the time and date. The second word slot group contains the addresses corresponding to the days of the week, each day being represented by four addresses corresponding to $d9$ to $d12$ locations. The third word slot group identifies the month and corresponds to $d13-d16$ location. The calendar ROM 98 provides the addresses required to output necessary codes from the display code generator 71. For example, if digit 7 is to be displayed, the display code generator 71 in location contains the information in a 5 × 7 format to illuminate only those LED elements which correspond to digit 7. The purpose of the calendar ROM 98 is to store the address location $x$ required to output digit 7 from the display code generator 71. The time ($t1-t16$) and the location of digit 7 ($d1-d16$) is defined by the content of the calendar counters 91. Hence, the input to the calendar ROM 98 is provided from the calendar counters 91.

It should be noted that in the calendar ROM 98 each word slot group is accessed during a specific time period. For example, the first group is accessed during $t1$ to $t8$ time, the second group is accessed during $t9$ to $t12$ and the third group is accessed during $t13$ to $t16$ time. This is provided through the multiplexer circuit of FIG. 9. During $t1$ to $t8$, the addresses from the time and date counters are provided, see FIG. 8. During $t1$ only one counter output appears at the output of the multiplexer 140. Based on this single counter output the calendar ROM 98 is addressed to output the appropriate address for the display code generator 71. Since the output of the time and date counters correspond to any one digit, there is a one to one relationship between the counter output and the time period. In other words, one counter output is read every time slot. In the case of the day or month counter, each counter output must correspond to three to four digits to represent three letter word such as MON, JAN, etc. As a result, the output of the multiplexer 140 represents the information from the day or month counters for four time slots. On these four time slots the address corresponding to one dot and one three letter word is provided as an output from the calendar ROM 98.

In summary, the calendar ROM 98 is read based on the calendar memory address CMA provided by the multiplexer 140. The multiplexer 140 organizes the information from three sets of counters 91 in a format such that the time and date counters 101, 103, 105 and 109 are available during the $t1$ to $t8$, the day counter 107 is available during $t9$ to $t12$ and the month counter 111 is available during $t13$ to $t16$. The calendar ROM 98 provides a six lead output CM1-CM6 which comprises the final address in the appropriate time period to address the display code generator 71 for final display output. The CM1-CM6 lead display output is provided to the display control logic 29 of FIG. 5 and the time comparison logic 31.

Figure 11:
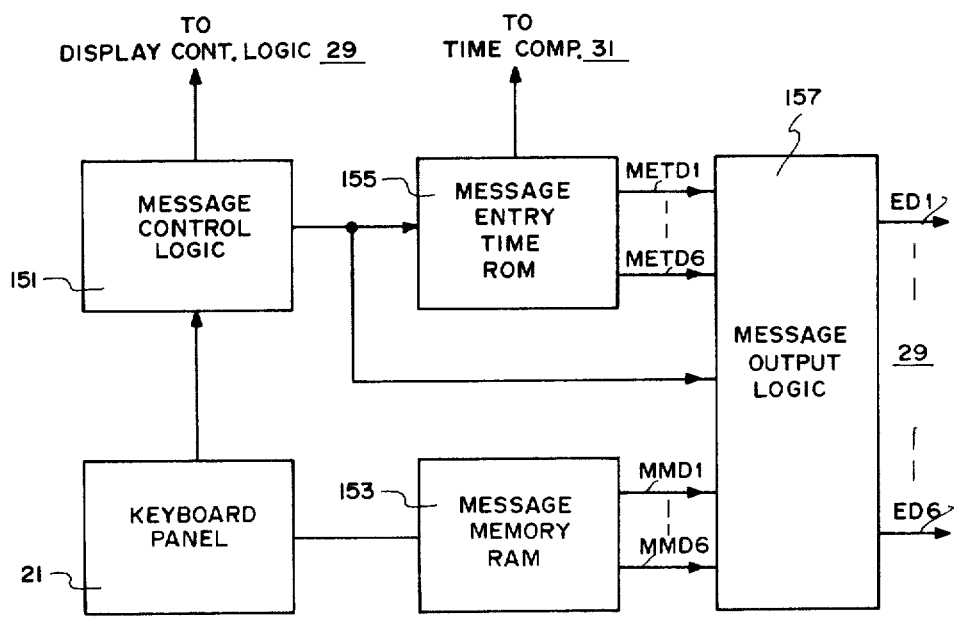
FIG. 11 is a block diagram of the message storage and control unit for the present invention.

FIG. 11 shows the message storage and control unit 25 which comprises the stored message segment of the electronic diary 20. The functional component circuits of the message storage and control unit 25 are comprised of the keyboard selector panel 21, the message control logic 151, the message memory RAM (random access memory) 153, the message entry time ROM memory 155 and message output logic 157. The input to the message storage and control unit 25 is through registration inputs of the keyboard 21. The output address of the final stage message output logic 157 consists of a six lead address ED1-ED6 and is connected to the display control logic 29 and to the time comparison logic 31. The message unit 25 functions to accept message and control inputs from the keyboard 21, store messages in the RAM 153 corresponding to a message entry time and provide the stored message as output information based on the control logic or audible alarm from the time comparison logic 31.

The keyboard input selection is provided in two basic functional forms: control and messages. The control inputs consist of mode selection, reset functions, and message skip. The message input is comprised of alphanumeric digits to be stored in the message memory RAM 153. The control logic 151 provides necessary control signals and timing to arrange messages in appropriate time and format. There is provided in the message control logic 151, the mode flip flop which determines whether the unit 20 is to be used either as an electronic diary or as a normal calendar unit. The message memory RAM 153 stores the messages entered from the keyboard 21. The messages in the memory RAM 153 are divided into a block of 16 digits. Each block of the memory RAM 153 corresponds to a specific message time. The time of the message entry could either be fixed or the same could be a variable to be entered from the keyboard 21. If 32 message entries are incorporated with four messages per hour for each of the eight working hours, the message entry ROM 155 with fixed message time is required. If a floating message time method is used, the message entry memory would be a random access memory similar to the RAM 153, and the message would be entered through the keyboard 21 into a random access memory as shown hereafter in FIG. 13. The message output logic 157 combines information from the message entry memory 155 and message memory 153 for outpulsing to the display control logic 29 for the purpose of displaying the message entry time before inputing the message.

The operational procedure for the electronic diary 20 is presented as fixed message time and variable message time, of which the fixed message time operation is first disclosed. In order to utilize the diary function, the switch from the keyboard 21 is turned on to the diary mode ED. The normal calendar display is thereby inhibited and the time from the message entry ROM 155 is visually displayed. It should be emphasized that during a diary mode ED the calendar operation continues as normal and only the visual display is inhibited. Once the time information (only in terms of hours and minutes such as 08:15) from the message entry memory is displayed, there is presented an option to either input the message corresponding to the time on display or skip into the next time. These options are provided through two keys; message enter and message skip. Once the message skip key is activated, the display 35 provides next message time in the sequence; such as 08:30. If the message is to be entered at the time (8:30), the message enter key is activated and the selected message is entered through the keyboard 21.

Once the sixteen digit message is complete, the message skip key is activated to bring the next message time on visual display. During the message entry process, the selected message is displayed, and if desired, the selected message can be erased by the message erase key. Once the message is loaded, the unit 20 is placed back into the calendar mode CM and normal operation continues until the message time TOD and the real time TOD match. As soon as a TOD match occurs, an alarm may be activated, the normal calendar information is inhibited and the message is visually displayed. Once utilized, the reset alarm key is activated to erase the message and simultaneously reset the buzzer alarm.

In this fixed message format following keys are required:

1. Mode — dc level requires a set reset flip flop — selects either a diary mode or a calendar mode.
2. Message skip — A pulse
   1. Resets the message load counter (to allow loading from the first digit)
   2. Sets the message enter FF (required to display the message enter time ROM)
   3. Advances the message segment counter (required for the next message time)
3. Message enter — a pulse
   1. Resets the message enter FF (required to display the message memory content during message input phase)
   2. Resets the message load counter (required to load from the message from the first digit)
4. Message reset — a pulse
   1. Activates an erase counter to count 16 variable message time.

The variable message time or mode operation is now presented wherein the switch from the keyboard 21 is turned on to the diary mode ED. Next the message time entry key 53 is turned on and the message time is entered through the keyboard 21 into the message memory RAM 153. After proper time entry the message enter key 53 is activated to enable selected messages to be entered through the keyboard 21. The message skip key 55 marks the completion of the first selected message for a new message time entry. The message skip 55 and erase key 59 perform the same functions as in the case of the above-described fixed message time mode.

The control logic 151 and the output logic 157 for the message storage and control unit 25 includes a number of status flip flop FF gating circuit counters for which the descriptions are given as follows:

1. Mode flip flop FF 161: This circuit consists of a set/reset type which can be set to logic one state by the mode switch during diary mode ED. During normal calendar operation, the set lead 162 is connected to a battery source (not shown) so the output signal thereof is forced to logic zero state. The output signal of the mode flip flop 161 is used to control the display control logic 29 for final information display.

2. Message segment counter 163: A five bit counter 163 is required to indicate any selected one of the 32 allowables message times wherein a message can be written. In the fixed time format, the time sequence is fixed such that the low time (such as 8:30 in the morning) corresponds to the low count and the high time (such as 4:30 in the afternoon) corresponds to the high count. The counter 163 is a free run counter and is advanced by a logic one count through the message skip key 55. The message segment counter 163 is employed to access the message entry time memory ROM 155 and message memory RAM 153.

3. Message load counter 165: A 4 bit binary counter 165 allows 16 different digits to be loaded into the message memory RAM 153. The 16 digits, thus, correspond to a typical message. The message entry key 53 or the message skip key 55 both serve to reset the counter 163 to logic zero state. The counter 163 once reset is advanced by any given one of the alpha or numeric entries from the keyboard 21.

4. Message enter flip flop FF 167: A set/reset type flip flop 167 which functions to enable the message enter time to be displayed while entering the associated time element. The flip flop 167 further allows the display of the message information while inputting through the keyboard 21. The flip flop 167 can be set by the message skip key 55 and reset by the message enter key 53 or an alarm flip flop status 57. The output of the flip flop 167 is provided to the message output logic 157 for gating information either from the message time memory ROM 155 or from the message memory RAM 153.

5. Message erase flip flop FF 169: A flip flop circuit 169 which activates the erase procedure to clear the contents of the message memory RAM 153 and the message time memory ROM 155 only in the variable time format. The flip flop 169 is set by the message erase key 59 or the alarm flip flop status 57. Once the flip flop 169 is set, the message load counter 165 is enabled to be loaded from the timing pules $t1$ to $t16$ in one scan period. At the end of the given scan period, the erase flip flop 169 is reset by the final $t16$ pulse. Hence during the erase mode, the message load counter 165 quickly counts 1 to 16. Next, the key which provides the all zero state that is required to erase the status of the message information in the message memory RAM 153 is activated to provide an input to the memory. In fact, the message erase key 59 could also provide the necessary logic code required to erase the memory RAM 153.

6. The output logic circuit 170: The output logic 170 is a gating circuit which enables information from the time and message memories 155 and 153, respectively, to be combined for the display input.

Figure 12:
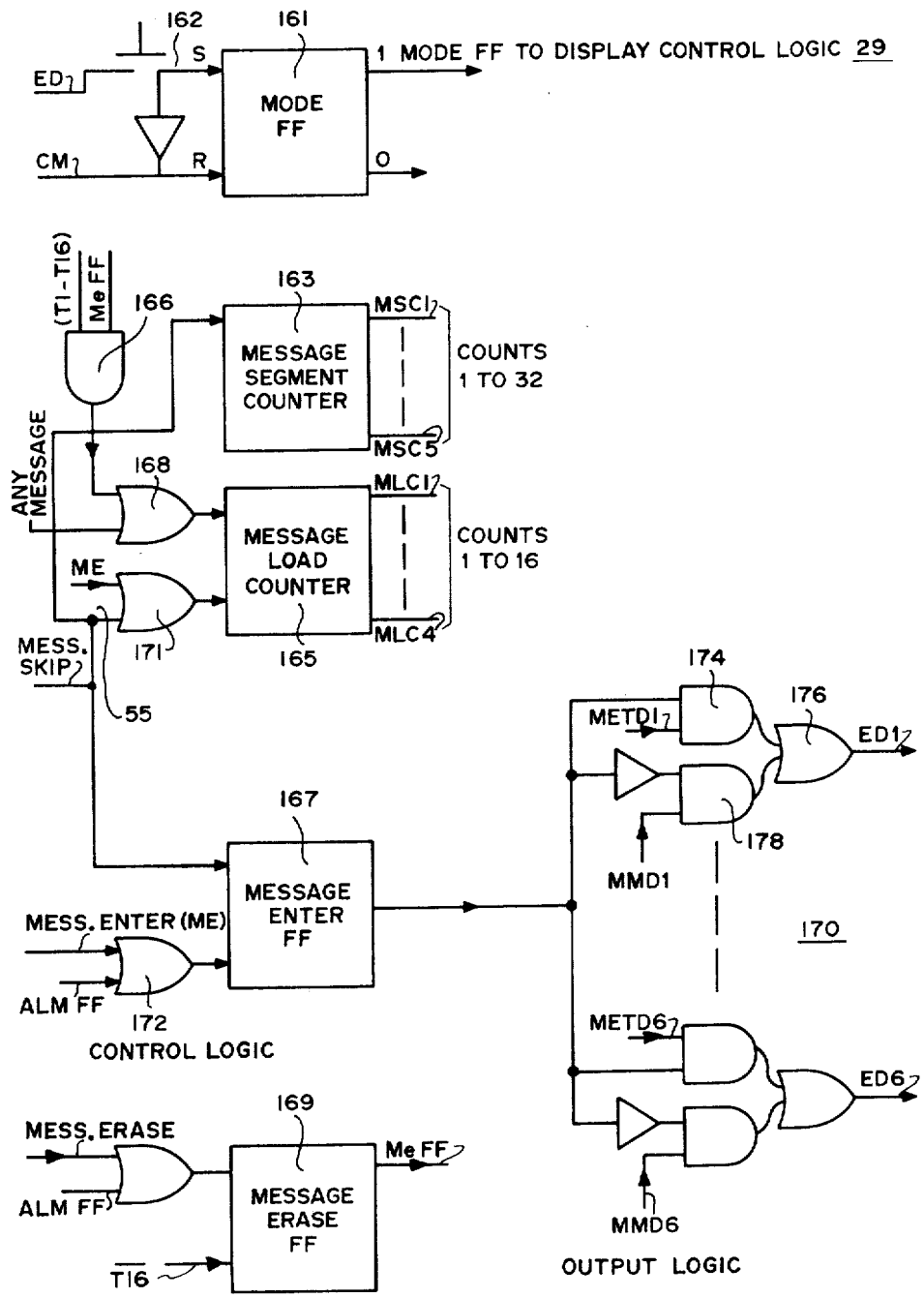
FIG. 12 is partially a block diagram and partially a schematic diagram of control logic and output logic circuitry for the message storage and control unit.

The mode FF 161 is set by the presence of the diary mode ED so that the logic state one is presented to the display control logic 29. In the circuit arrangement of the electronic diary 20, if the display control logic 29 receives a logic one from either the mode FF 161 or the time comparison logic 31, the display control logic 29 will display electronic diary messages chosen from the time memory ROM 155 or the message memory RAM 153; otherwise, the calendar mode will be displayed. As shown in FIG. 12 the message erase FF 169 produces a logic output signal MeFF which is connected to the message load counter 165 through a combination AND gate 166 and an OR gate 168. The message erase FF 169 receives alternative message erase signal and alarm FF signal from keys 59 and 57, respectively. Further the FF 169 receives logic code input NOT $t16$. The timing signals $t1-t16$ are received to the AND gate 166 for the generation of the output signal thereof to the OR gate 168. The OR gate 168 receives any message entry from the keyboard 21. The resultant output of the OR gate 168 forms the increment signal for the message load counter 165. The message load counter 165 further receives a signal from an OR gate 171 which is inputted by the message enter key 53 and the message skip key 55.

The message segment counter 163 has five binary outouts MSC1–MSC5 for providing counts 1 to 32 used for writing any one of the 32 blocks in the message memory RAM 153. Similarly, the message load counter 165 provides four binary outputs MLC1–MLC4 which serve to provide counts 1 to 16 used for writing 16 words in each block of the message memory RAM 153. The message entry flip flop 167 is set by the message skip signal 55 and is reset by either message entry signal 53 or the alarm FF 57 through an OR gate 172. The output of the message entry flip flop 167 is connected to the output logic 170 consisting of six identical logic circuits (two of which are shown in FIG. 12). AND gate 174 combines message entry time signal D1 and the output from the message entry FF 167 to provide an output to an OR gate 176. AND gate 178 combines message memory signal D1 and the inverted logic signal from the message entry FF 167 to provide an alternative output signal to the OR gate 176 whereby the described logic circuit 170 develops the electronic diary output ED1. FIG. 12 shows the development of the electronic diary signal ED6 from the alternative inputs of message entry time signal D6 and message memory signal D6.

Figures 13, 13A:
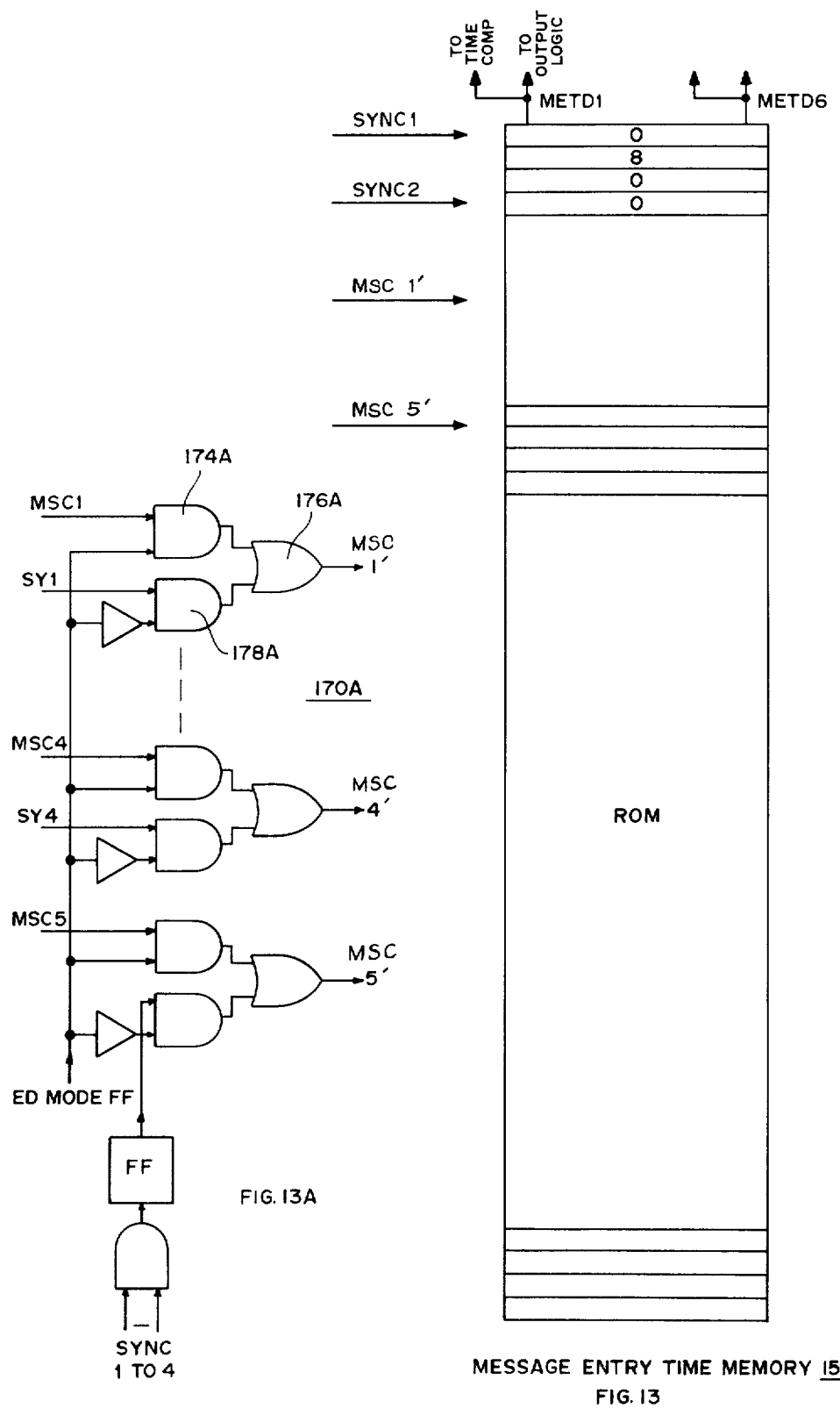
FIG. 13 is a representation of a message entry time ROM memory.
FIG. 13A is a logic schematic diagram of an output circuit for use with the memory apparatus of FIG. 13.

FIG. 13 shows that the message entry time memory ROM 155 which is applied in connection with the fixed time format operation described above. It is seen that the ROM 155 is comprised of 32 groups or blocks of four words each. Each word corresponds to a digit to be displayed and a group of four words allows the hour and minute to be represented for a message time (such as 08:30). The message segment counter 163, through its outputs MSC1–MSC5, determine the selected block of four words to be displayed. The outputs of the time memory ROM 155, MET D1–D6, to the message output logic 157 (shown in detail by the output logic circuitry 170) are further connected to the time comparison logic 31 of FIG. 15 as will be discussed hereafter. In connection with FIG. 13, there is shown a FIG. 13A disclosing output logic 170A which is similar to the output logic 170 of FIG. 12. The output logic 170A is comprised of five circuits which are of the same construction to the individual logic circuit 170. AND gate 174A receives one of its two inputs from the electronic diary mode FF 161, the other input is the signal MSC1 from the message segment counter 163. AND gate 178A combines the synchronizer output SYN1 and the inverted ED mode FF 161 signal to provide an output to an OR gate 176A whereby the described logic circuit 170A develops logic signal MSC1'. A logic signal MSC4' is shown developed in FIG. 13A from the inputs ED mode FF 161, MSC4 and SYN4. The five MSC message segment counter signals MSC1' – MSC5' are shown in FIG. 13 being connected to the time memory ROM 155 during the diary mode ED operation. The time memory ROM 155 receives inputs SYN1–SYN2 from the 8:1 multiplexers 135–138 of FIG. 9. The ROM 155 is read during the ED mode by the signals MSC1'–MSC5', and is read during the CM mode according to the operation of the synchronizer signals. It is to be noted that four words w1 to w4 are always read to the comparison logic 31. The ROM 155 is shown on FIG. 13 to provide the output signals MET D1–D6.

Figures 14, 14A:
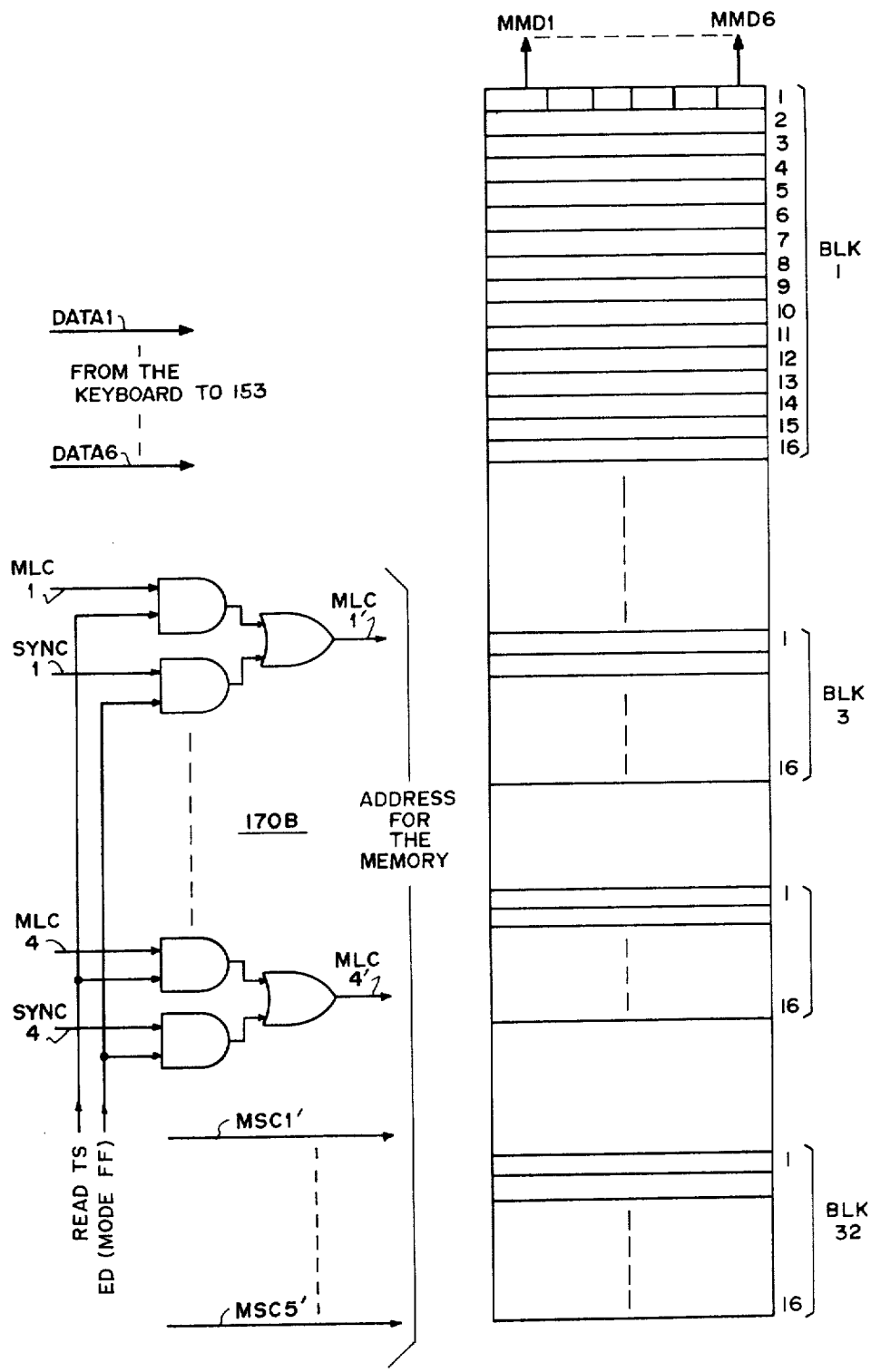
FIG. 14 is a representation of a message memory RAM.
FIG. 14A is a logic schematic diagram of another output circuit for use with the memory apparatus of FIG. 14.

FIG. 14 shows the message memory RAM 153, likewise comprised of 32 memory blocks corresponding to 32 allowable messages, block one thereof being comprised of 16 digits. The output of RAM 153 consists of logic signals MMD1–MMD6, which are also shown in FIG. 11 connecting the RAM 153 to the output logic 157. In FIG. 14A there is shown address logic circuitry 170B which is similar to the circuitry 170A, and being four logic circuits each of which is comprised of an OR gate receiving inputs from a pair of AND gates triggered by the signals MLC1–MLC4 during the presence of the ED mode from the mode FF 161, and otherwise, triggered by synchronizer signals SYNC1–SYNC4. The signals MLC1'–MLC4' are the outputs of the output logic circuitry 170B and are connected to the RAM 153 for the purpose of reading or writing the same during the ED mode. The RAM 153 is caused to be read every time slot through the time slot timing signal TS shown in use with FIG. 14A.

Figure 15:
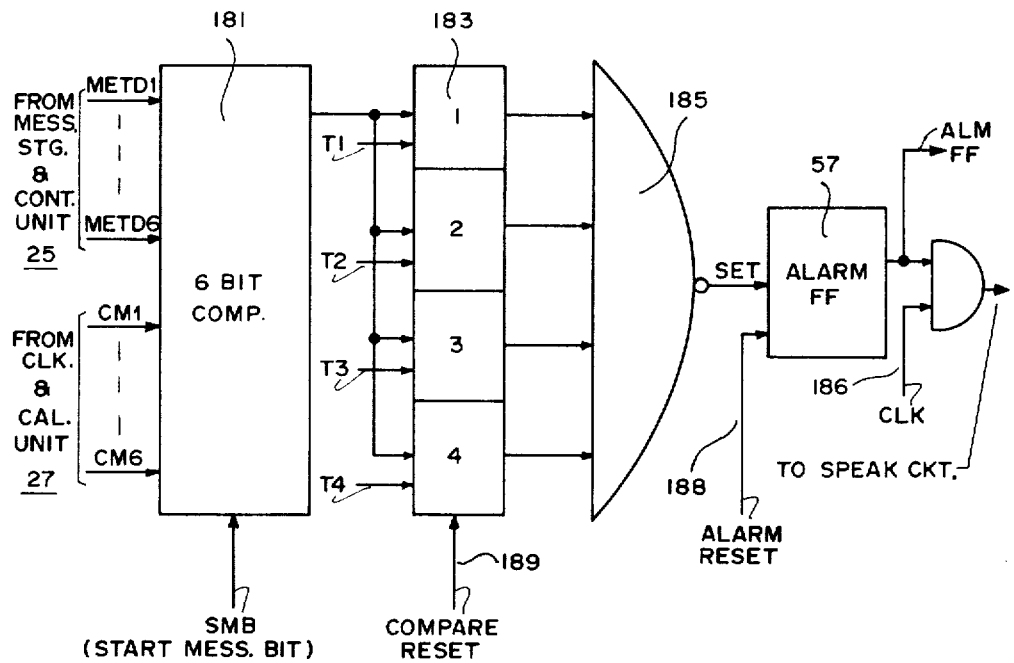
FIG. 15 is a block diagram of a time comparison logic useful with the present invention.

FIG. 15 shows the time comparison logic 31 which is used to compare the message time TOD received through the MET D1–D6 lines from the message storage and control unit 25 and the real time TOD received through the CM1–CM6 lines from the clock and calendar unit 27. The inputs MET D1–D6 and CM1–CM6 are compared by a 6-bit comparator circuit 181 of state-of-the-art configuration only during the message times TOD wherein a message is available for the case of a fixed message format. Thus timing is initiated by the signal SMB (start message bit) provided to the comparator circuit 181. The signal SMB can be provided by a 32 × 1 bit memory wherein one bit corresponds to each message time and can be set by the message enter Key 53 and reset by the message erase Key 59. In order to assure against activation based on noise interference, the comparison is desirably made four times during a selected scan cycle, see circuitry 183 and AND gate 185. Now, if the four comparison times are true, the alarm FF 57 is set and the buzzer alarm 37 is activated by the clock signal 186 during the alarm mode. There are provided alarm reset signal 188 and compare reset signal 189.

Figure 16:
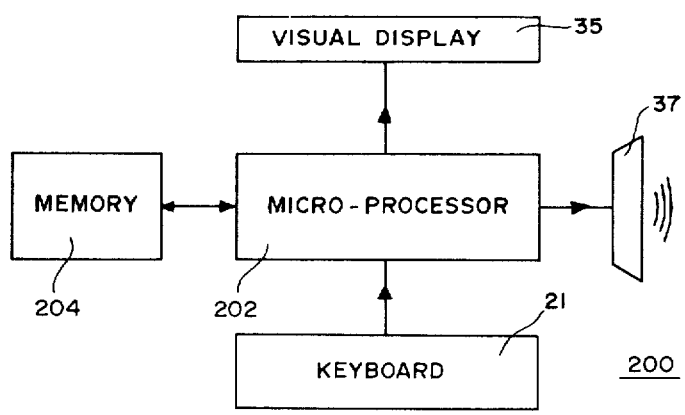
FIG. 16 is a block diagram of the electronic diary comprised of a microprocessor circuit and a separate memory circuit.

FIG. 16 shows the electronic diary circuit 25 of FIG. 1 in an implementation herein referred to as electronic diary microprocessor circuit 200. The electronic diary can be comprised of a state-of-the-art microprocessor circuit 202 and a separate random access memory circuit 204. The microprocessor 202 can be a 4-bit or 8-bit microprocessor similar to the commercially available INTEL 4004 or INTEL 8008. The microprocessor 202 is substituted for the control functions (all non-memory functions) of the message storage and control unit 25, the clock and calendar unit 27, as well as the logic operations of the display control logic 29 and the time comparison logic 31. The memory 204 is provided with memory capacity for all message data (both entry time and message data), all fixed format real time of day TOD and associated programming address data. The visual display 35, the speaker 37 and the Keyboard 21 remain as common elements.

When it is desired to combine the electronic diary 20 with the operation of an electronic calculator, FIG. 3, having already the provisions of a keyboard 21 calculator circuit 60 and display 33 and 35, it is only required to add the electronic diary unit 20, the speaker alarm 37 and the gating logic 63 which is primarily a choice made by the Ed/CM mode switch 51 and the calculator switch 50. It is to be understood that while the present invention has been shown and described with respect to a preferred embodiment thereof, the scope of the invention is not intended to be so limited and other equally suitable and equivalent modifications and changes may be made therein without departing from the spirit and scope of the invention.

What is claimed is:

1. An electronic diary circuit comprising in combination: clock-calendar means for generating real time of day and date signals, input selector means for generating as input signals predetermined message time of day and date signals and preselected associated daily schedule and message events data signals, means for visually displaying selected output signals including real time of day and date signals, message time of day and date signals, and daily schedule and message events data signals, message storage and control means having storage means receiving thereto and storing therein said daily schedule and message events data signals incoming from said selector means, and further having control means providing for message entry to and message read-out from said storage means, said data signals being associated with selected message time of day and date signals, respectively, time comparison logic means connected to receive both real time of day and date signals and message time of day and date signals, said comparison means comparing the same and providing first output signals responsive to equal comparisons thereof, respectively, and display control means connected to receive said first output signals from said comparison means, real time of day and date signals from said clock-calendar means, and message time of day and date signals together with associated daily schedule and message events data signals from said message storage and control means, said display control means providing said real time of day and date signals to said visual display means for display thereon when said real time of day and message time of day signals are different and providing said daily schedule and message events data signals to said visual display means when said real time of day and message time of day signals are equal to each other in response to the receipt of said first output signals from said time comparison means.

2. An electronic diary circuit as claimed in claim 1 wherein said clock-calendar means includes counter means for generating through counting operation a first plurality of time of day logic signals, multiplexer means connected to receive thereto said first plurality of time of day logic signals and selectively gating the same during a plurality of time scan intervals comprising a selected time scan period repetitively reoccurring, said multiplexer means providing from said gating operation, sets of logic address signals representative of gated time of day logic signals occurring during said time scan intervals, respectively, and first memory means having stored therein fixed logic address signals representative of all selectable combinations of time of day events, said first memory means being activated during the occurrence of each time scan interval of said reoccurring time scan periods to receive thereto the gated set of logic address signals from said multiplexer means and to output therefrom an associated set of fixed logic address signals representative of stored time of day events selected by the coding of said received gated set of logic address time of day signals.

3. An electronic diary circuit as claimed in claim 2 wherein said first memory means is comprised of a fixed format read-only memory ROM.

4. An electronic diary circuit as claimed in claim 1 wherein said control means for the message storage and control means includes a flip-flop providing a first mode signal controlling an electronic diary mode of operation when in one switching state thereof and providing a second mode signal controlling a calendar mode of operation when in the other switching state thereof, said display control means includes logic gating devices connected to alternatively receive both said real time of day and date signals and said message time of day and associated daily schedule and message events data signals, and further includes a switching device connected to receive said first and second mode signals and said first output signals from said time comparison logic means and further connected in controlling relationship to said logic gating devices to select the gating therethrough of said real time of day and date signals when said second mode signal is received and the gating of said message time of day and date signals when said first mode signal is received and also when said first output signals are received from said time comparison logic means.

5. An electronic diary circuit as claimed in claim 4 wherein said message storage and control means includes message output logic means, said storage means thereof is comprised of first message memory means connected to said input selector means for receiving input registrations of said predetermined daily schedule and message events data signals, said first message memory means providing a first set of output logic address signals representative thereof, and second message memory means connected to said input selector means for receiving input registrations of said message time of day and date signals, said second message memory means providing a second set of output logic address signals representative thereof, and said message control means is connected to receive a first selector signal from said input selector means, said message control means providing a first gating signal to said message output logic means when said first selector signal is received thereto, said gating signal providing the output gating of a selected one of said first set and said second set of output logic address signals from said first and second message memory means, respectively, said selected set of output logic address signals being connected to said logic gating devices of said display control means.

6. An electronic diary circuit as claimed in claim 5 wherein said flip-flop of said message storage and control means is a first flip-flop provided in said message control means, and said message control means further includes a second flip-flop providing in one switching state thereof said first gating signal to said message output logic means when said first selector signal is received thereto, second and third selector signals are provided through said input selector means, said second selector signal being connected to said second flip-flop to switch said second flip-flop to the second switching state thereof in preparation for a subsequent receipt of said first selector signal, said message control means further including a third flip-flop providing in one switching state thereof a second gating signal when said third selector signal is received thereto.

7. An electronic diary circuit as claimed in claim 6 wherein said message control means includes first counter means connected to receive the input registrations entered through said input selector means of predetermined message time of day and date signals and associated daily schedule and message events data signals, said first counter means providing therefrom first counter logic address signals connected to said first message memory means, second counter means connected to receive said second gating signal from said third flip-flop and said first selector signal from said input selector means, and providing upon receipt of either one thereof second counter logic address signals connected to said second message memory means, said first and second counter logic address signals addressing said first and second message memory means to provide said first set and said second set of output logic address signals therefrom, respectively.

8. An electronic diary circuit as claimed in claim 7 wherein said first message memory means is comprised of a fixed message time format memory device, and said second message memory means is comprised of a variable message time format memory device.

9. An electronic diary circuit as claimed in claim 8 wherein said first and second message memory means are comprised of read-only memory ROM circuits.

10. An electronic diary circuit as claimed in claim 7 wherein said input selector means includes keyboard means having depressable push-type selector keys and bi-positionable switch keys, one of said bi-positionable keys setting said electronic diary mode of operation when in one position thereof and setting said calendar mode of operation when in the other position thereof, and the depression of preselected ones of said depressable selector keys providing said first, second and third selector signals, respectively, said keyboard further having other depressable selector keys for selecting any combination of alpha and numeric representations to comprise desired message time of day and date signals and associated daily schedule and message events data signals.

11. An electronic diary circuit as claimed in claim 7 wherein said first output signals from said time comparison logic means is also connected to said second flip-flop to switch said second flip-flop to the second switching stage thereof in preparation for a subsequent receipt of said first selector signal, and is further connected to said third flip-flop to switch said third flip-flop to the one switching stage thereof for providing said second gating signal.

12. An electronic diary circuit as claimed in claim 7 wherein said time comparison logic means includes a logic comparator circuit connected to receive said first set of output logic address signals from said first message memory means being representative of message time of day and date signals, said clock-calendar means includes calendar memory means providing a third set of output logic address signals representative of real time of day and date signals, said third set of output logic address signals being connected to said logic comparator circuit, said logic comparator circuit providing a logic comparator output signal when said message time of day is equal to said real time of day, said time comparison logic means further includes timing means connected to receive said logic comparison output signal, said timing means having consecutively occurring timing signals and providing a corresponding number of comparison positive logic signals when said logic comparison output signal is received during the occurrences of said timing signals, respectively, and said time comparison logic means further including an alarm flip-flop being set into one switching state thereof by the occurrence of said comparison positive logic signals and providing in said one switching state said first output signals as an alarm output signal.

13. An electronic diary circuit as claimed in claim 12 wherein said electronic diary circuit further includes audible speaker means connected to receive said alarm output signal from said time comparison logic means and to provide an audible alarm upon receipt thereof representative of an equal comparison between said message time of day and date signals and said real time of day and date signals.

14. An electronic display apparatus comprising in combination: electronic diary means including means for generating real time of day and date signals and means for storing for predetermined releases thereof message time of day and date signals and associated daily schedule and message events data signals, electronic calculating means for calculating composite and resultant numeric signals representative of certain selected calculative operations determined by input preselected numeric values and arithmetic operations, input selector means including Keyboard actuable Keys, first ones of which are connected to said electronic diary means and second ones of which are connected to said electronic calculating means, selective actuation of said first ones of said Keys providing first input signals comprising predetermined message time of day and date signals and preselected associated daily schedule and message events data signals and selective actuation of said second ones of said Keys providing second input signals comprising said input preselected numeric values and arithmetic operations, time comparison logic means connected to receive both real time of day and date signals and message time of day and date signals, said comparison means comparing the same and providing an equal comparison output signal responsive to equal comparison thereof, respectively, first display control means connected to said time comparison means to receive said equal comparison output signals and to said electronic diary means to receive said real time of day and date signals and said message time of day and date signals and associated daily schedule and message events data signals, said first display control means providing first displayable output signals representative of said real time of day and date signals when said real time of day and date signals and said message time of day and date signals are unequal, respectively, and providing second displayable output signals representative of said message time of day and date signals and said daily schedule and message events data signals when said equal comparison output signals are received, respectively, second display control means connected to said electronic calculating means and providing third displayable output signals representative of said composite and resultant numeric signals, selector gating means connected to receive as inputs thereto said first, second and third displayable output signals from said first and second display control means and gating the release of a selected one of said first, second and third displayable output signals as a resultant displayable output signal, and means for visually displaying said resultant displayable output signal.

15. An electronic diary circuit comprising in combination: clock-calendar means including first counter means counting time units in seconds, minutes, hours, days, months, and dates for comprising real time of day and date signals and further including first memory means having first stored time data signals representative of selected combinations of said real time of day and date signals, said first memory means providing selected ones of said first stored time data signals as first output signals therefrom in response to the input of said real time of day and date signals from said first counter means, keyboard selector means for selecting input registration signals, first ones thereof being representative of message time of day and date signals and second ones thereof being representative of daily schedule and message events data signals, visual display means for visually displaying selected output signals, message control means selectively gating said first ones and said second ones of said input registration signals from said keyboard selector means, said message control means providing first control signals in response to said selective gating thereof, message storage means including second memory means having second stored time data signals therein and being connected to receive said first ones of said input registration signals to provide selected ones of said first stored data signals as second output signals therefrom and third memory means connected to receive said second ones of said input registration signals from said message control means for storage therein and to provide the same as third output signals therefrom in accordance with said selective gating of said message control means, message output logic means having gating devices receiving said second output signals and said third output signals from said second and third memory means, respectively, and said first control signals from said message control means, said gating devices selectively providing either the second or third output signals as fourth output signals therefrom upon receipt of said first control signals, time comparison logic means connected to receive both said first output signals from said first memory means and said second output signals from said message output logic means, said comparison means comparing the same and providing first comparison signals responsive to equal comparisons thereof, respectively, and display control means connected to receive said first comparison signals from said comparison means, first output signals from said clock-calendar means, fourth output signals from said message output logic means for providing said first output signals to said visual display means for display thereon when said first output signals and said second output signals are unequal and providing said fourth output signals to said visual display means for display thereon when said first output signals and said second output signals are equal in response to the receipt of said first comparison signals from said time comparison means.

16. An electronic diary circuit as claimed in claim 15 wherein said first, said second and said third memory means comprise a random access memory unit.

17. An electronic diary circuit as claimed in claim 16 wherein said first counter means, said message control means, said message output logic means and said time comparison logic means comprise microprocessor circuit means.

18. An electronic diary circuit as claimed in claim 15 wherein said display control means is a first display control means, and said electronic diary circuit further includes electronic calculating means for calculating composite and resultant numeric signals representative of certain selected calculative operations determined by input preselected numeric values and arithmetic operations, second display control means are connected to receive said composite and resultant numeric signals from said electronic calculating means, selector gating means are connected to said first and said second display control means and to said visual display means for selectively providing the visual display either said first output signals or said fourth output signals from said first display control means or said composite and resultant numeric signals from said second display control means.

19. An electronic diary circuit as claimed in claim 15 wherein said message control means includes a first flip-flop providing a first state signal, a second flip-flop provides a second state signal being said first control signal from said message control means, said input registration signals from said keyboard selector means includes third, fourth and fifth input signals, said third and fourth input signals being connected to set said first flip-flop to provide said first state signal and to set said second flip-flop to provide said second state signal, respectively, and said fifth input signals being connected to reset said second flip-flop and further including second and third counter means providing second and third count state signals, respectively, said second counter means being connected to receive said fourth input signals and being incremented to change said second count state with the receipt of each of said fourth input signals, and said third counter means being connected to receive said first state signal from said first flip-flop and to change said third count state with the receipt thereof, and further being connected to receive said second ones of said input registration signals, said third counter means changing said third count state with each receipt thereof, said second count state signals being selective of the data signal storage within said second memory means and said third count state signals being selective of the data signal storage within said third memory means.

20. An electronic diary circuit as claimed in claim 19 wherein said first comparison signals are connected to said first flip-flop to also provide said first state signal in addition to said third input registration signals, respectively, and are connected to said second flip-flop to also reset said second flip-flop in addition to said fifth input signals, said fourth and said fifth input signals from said keyboard means being connected to reset said third counter means.

21. An electronic diary circuit as claimed in claim 20 wherein said second count state signals are also selective of the data signal storage within said third memory means in conjunction with said third count state signals.

* * * * *